(12) United States Patent
Fukatsu

(10) Patent No.: US 10,414,238 B2
(45) Date of Patent: Sep. 17, 2019

(54) VEHICLE AIR CONDITIONING APPARATUS

(71) Applicant: SANDEN HOLDINGS CORPORATION, Isesaki-shi, Gunma (JP)

(72) Inventor: Keita Fukatsu, Isesaki (JP)

(73) Assignee: SANDEN HOLDINGS CORPORATION, Isesaki-shi, Gunma (JP)

( * ) Notice: Subject to any disclaimer, the term of this patent is extended or adjusted under 35 U.S.C. 154(b) by 233 days.

(21) Appl. No.: 15/310,963

(22) PCT Filed: Mar. 16, 2015

(86) PCT No.: PCT/JP2015/057724
§ 371 (c)(1),
(2) Date: Nov. 14, 2016

(87) PCT Pub. No.: WO2015/182220
PCT Pub. Date: Dec. 3, 2015

(65) Prior Publication Data
US 2017/0072765 A1    Mar. 16, 2017

(30) Foreign Application Priority Data

May 27, 2014 (JP) .................. 2014-108858

(51) Int. Cl.
*B60H 1/00* (2006.01)
*F25B 27/00* (2006.01)
(Continued)

(52) U.S. Cl.
CPC ..... *B60H 1/00007* (2013.01); *B60H 1/00028* (2013.01); *B60H 1/00207* (2013.01);
(Continued)

(58) Field of Classification Search
CPC .......... B60H 2001/00078; B60H 2001/00085; B60H 2001/00178; B60H 2001/00214;
(Continued)

(56) References Cited

U.S. PATENT DOCUMENTS 5,168,722 A * 12/1992 Brock ................... B60H 1/3202
261/DIG. 4
5,481,885 A * 1/1996 Xavier ............... B60H 1/00028
454/148
(Continued)

FOREIGN PATENT DOCUMENTS

JP       9-150617 A       6/1997
JP       2553596 Y2 *    11/1997
(Continued)

OTHER PUBLICATIONS

Japan Patent Office, Notification of Reasons for Refusal issued in Japanese Patent Application No. 2014-108858, dated Feb. 27, 2018.
(Continued)

*Primary Examiner* — Cassey D Bauer
*Assistant Examiner* — Miguel A Diaz
(74) *Attorney, Agent, or Firm* — Baker Botts L.L.P.

(57) ABSTRACT

A vehicle air conditioning apparatus includes an air conditioning case including a case body having a case opening that is open to an air conditioning opening, and a case cover that can open and close the case opening. The case cover can be attached/detached to/from the case body via the air conditioning opening outside of the vehicle interior. An evaporator and a heater can be attached/detached to/from the case body via the air conditioning opening outside of the vehicle interior, while the case cover is removed from the case body to open the case opening.

4 Claims, 13 Drawing Sheets

(51) Int. Cl.
  *B60H 1/32* (2006.01)
  *B60H 1/22* (2006.01)
(52) U.S. Cl.
  CPC ..... *B60H 1/00514* (2013.01); *B60H 1/00535* (2013.01); *B60H 1/00564* (2013.01); *B60H 1/3202* (2013.01); *B60H 1/3204* (2013.01); *B60H 1/0005* (2013.01); *B60H 1/00035* (2013.01); *B60H 2001/00078* (2013.01); *B60H 2001/00107* (2013.01); *B60H 2001/00214* (2013.01); *B60H 2001/00621* (2013.01); *B60H 2001/2268* (2013.01)
(58) Field of Classification Search
  CPC .... B60H 2001/2268; B60H 2001/2278; B60H 2001/2281; B60H 2001/2287; B60H 2001/229; B60H 1/00021; B60H 1/00028; B60H 1/00007; B60H 1/00035; B60H 1/0005; B60H 1/00207; B60H 1/00271; B60H 1/00457; B60H 1/00464; B60H 1/00471; B60H 1/00514–00564; B60H 1/00621; B60H 1/26
  See application file for complete search history.

(56) References Cited

U.S. PATENT DOCUMENTS

| | | | | |
|---|---|---|---|---|
| 5,737,936 | A * | 4/1998 | Takasaki | B60H 1/00514 165/122 |
| 6,029,739 | A * | 2/2000 | Izawa | B60H 1/00514 165/42 |
| 6,062,298 | A * | 5/2000 | Lee | B60H 1/00028 165/203 |
| 6,397,609 | B1 * | 6/2002 | Shikata | B60H 1/00514 361/701 |
| 6,422,301 | B1 * | 7/2002 | Scoccia | B60H 1/3233 165/42 |
| 8,544,528 | B2 * | 10/2013 | Seto | B60H 1/00064 165/101 |
| 9,636,968 | B2 * | 5/2017 | Makita | B60H 1/00528 |
| 2002/0129932 | A1 * | 9/2002 | Nagata | B60H 1/00028 165/202 |
| 2003/0037912 | A1 * | 2/2003 | Stauter | B60H 1/00471 165/122 |
| 2004/0069480 | A1 * | 4/2004 | Yamamoto | B60H 1/00028 165/202 |
| 2011/0005708 | A1 * | 1/2011 | Seto | B60H 1/00064 165/41 |
| 2011/0005715 | A1 * | 1/2011 | Seto | B60H 1/00028 165/61 |
| 2012/0070320 | A1 * | 3/2012 | Ishii | F04D 17/167 417/313 |
| 2017/0203631 | A1 * | 7/2017 | Ryu | B60H 1/22 |
| 2017/0217284 | A1 * | 8/2017 | Ji | B60H 1/00292 |
| 2017/0247061 | A1 * | 8/2017 | An | B60H 1/00207 |
| 2018/0072131 | A1 * | 3/2018 | Lee | B60H 1/00028 |
| 2018/0093545 | A1 * | 4/2018 | Park | B60H 1/00028 |
| 2018/0099539 | A1 * | 4/2018 | Han | B60H 1/00535 |
| 2018/0111445 | A1 * | 4/2018 | Ryu | B60H 1/00328 |
| 2018/0134114 | A1 * | 5/2018 | Eckelberg | B60H 1/00535 |
| 2018/0141405 | A1 * | 5/2018 | Iyer | B60H 1/00064 |
| 2018/0162190 | A1 * | 6/2018 | Hensler | B60H 1/0005 |
| 2018/0162201 | A1 * | 6/2018 | Jee | B60H 3/0078 |

FOREIGN PATENT DOCUMENTS

| | | | |
|---|---|---|---|
| JP | 2002-144844 | A | 5/2002 |
| JP | 2002144844 | A * | 5/2002 |
| JP | 2005-170121 | A | 6/2005 |
| JP | 2009-113560 | A | 5/2009 |
| JP | 2011-057129 | A | 3/2011 |
| JP | 2012-091660 | A | 5/2012 |

OTHER PUBLICATIONS

Japan Patent Office, International Search Report for PCT/JP2015/057724, dated Jun. 16, 2015.

* cited by examiner

VEHICLE AIR CONDITIONING APPARATUS

CROSS-REFERENCE TO RELATED APPLICATIONS

This application is a U.S. National Stage Patent Application under 37 U.S.C. § 371 of International Patent Application No. PCT/JP2015/057724, filed on Mar. 16, 2015, which claims the benefit of Japanese Patent Application No. JP 2014-108858, filed on May 27, 2014, the disclosures of each of which are incorporated herein by reference in their entirety.

TECHNICAL FIELD

The present invention relates to a vehicle air conditioning apparatus used in, for example, a vehicle provided with a driver's seat above an engine.

BACKGROUND ART

Conventionally, there has been known a vehicle air conditioning apparatus including an air conditioning case that accommodates an evaporator for cooling air and a heater for heating the air, and a fan unit that supplies the air into the air conditioning case. The air conditioning case and the fan unit are provided in an instrument panel disposed in the front side of the vehicle interior.

In this vehicle air conditioning apparatus, by detaching the instrument panel to expose the air conditioning case and the fan unit to the vehicle interior, components such as the evaporator and the heater in the air conditioning case and an electric motor of the fan unit can be maintained and replaced.

In order to replace the components of the vehicle air conditioning apparatus, a number of work processes, such as removal of the instrument panel, and removal of the components from the air conditioning case and the fan unit, are required. Therefore, the work for replacing the component of the vehicle air conditioning apparatus would be cumbersome.

To address this problem, there has been known a vehicle air conditioning apparatus that can replace the evaporator from the outside of the vehicle interior. In this vehicle air conditioning apparatus, the air conditioning case and the fan unit are disposed in the front side of the vehicle interior, and an opening is formed in a separating plate which separates the vehicle interior from the outside of the vehicle interior, so that the evaporator can be replaced from the front surface side of the vehicle via the opening (see, for example, Patent Literature 1).

CITATION LIST

Patent Literature

PTL1: Japanese Utility Model Registration No. 2553596

SUMMARY OF INVENTION

Technical Problem

However, with this vehicle air conditioning apparatus, even though the evaporator can be replaced from the front surface side of the vehicle, the components other than the evaporator need to be replaced from the inside of the vehicle interior, and therefore the work for replacing the components other than the evaporator would be still cumbersome.

It is therefore an object of the present invention to provide a vehicle air conditioning apparatus that can replace various components from the front surface side of the vehicle and facilitate the work for attaching/detaching the components.

Solution to Problem

According to a first aspect of the present invention, a vehicle air conditioning apparatus used in a vehicle including a separating plate provided on a front of a vehicle interior and configured to separate the vehicle interior from an outside of the vehicle interior, an air conditioning opening being formed in the separating plate, the vehicle air conditioning apparatus comprising: an air conditioning case provided inside of the vehicle interior with respect to the air conditioning opening and configured to accommodate an evaporator for cooling air and a heater for heating the air, the evaporator and the heater being arranged in the air conditioning case in a front-to-back direction; and a fan unit provided inside of the vehicle interior with respect to the air conditioning opening and configured to supply the air into the air conditioning case, wherein: the air conditioning case includes a case body having a case opening that is open to the air conditioning opening, and a case cover that can open and close the case opening; the case cover can be attached/detached to/from the case body via the air conditioning opening outside of the vehicle interior; and the evaporator and the heater can be attached/detached to/from the case body via the air conditioning opening outside of the vehicle interior, while the case cover is removed from the case body to open the case opening.

According to a second aspect of the present invention, a vehicle air conditioning apparatus used in a vehicle including a separating plate provided on a front of a vehicle interior and configured to separate the vehicle interior from an outside of the vehicle interior, an air conditioning opening being formed in the separating plate, the vehicle air conditioning apparatus comprising: an air conditioning case provided inside of the vehicle interior with respect to the air conditioning opening and configured to accommodate an evaporator for cooling air and a heater for heating the air, the evaporator and the heater being arranged in the air conditioning case in a front-to-back direction; and a fan unit provided inside of the vehicle interior with respect to the air conditioning opening and configured to supply the air into the air conditioning case, wherein: the fan unit includes a driving part configured to rotate an impeller, and an air suction part configured to suck the air to be supplied into the air conditioning case; the air suction part can be attached/detached to/from the fan unit via the air conditioning opening outside of the vehicle interior; and the driving part can be attached/detached to/from the fan unit via the air conditioning opening outside of the vehicle interior, while the air suction part is removed from the fan unit.

By this means, it is possible to expose various components to the front side of the vehicle via the air conditioning opening, and therefore to attach and detach the components from the front side of the vehicle.

Effect of the Invention

According to the present invention, it is possible to attach and detach various components via the air conditioning opening, and therefore to facilitate the work for replacing the components and also to improve the working efficiency of the maintenance and repair.

DESCRIPTION OF EMBODIMENTS

FIGS. 1 to 12 show an embodiment of the present invention. Here, the front-to-back direction, the right-to-left direction (width direction) and the vertical direction described in the present embodiment correspond to those of the vehicle equipped with the vehicle air conditioning apparatus according to the present invention.

The vehicle air conditioning apparatus according to the present invention is applied to a vehicle such as a cab over truck having a vehicle interior C provided above an engine E as a power source for driving the vehicle.

Figure 1:
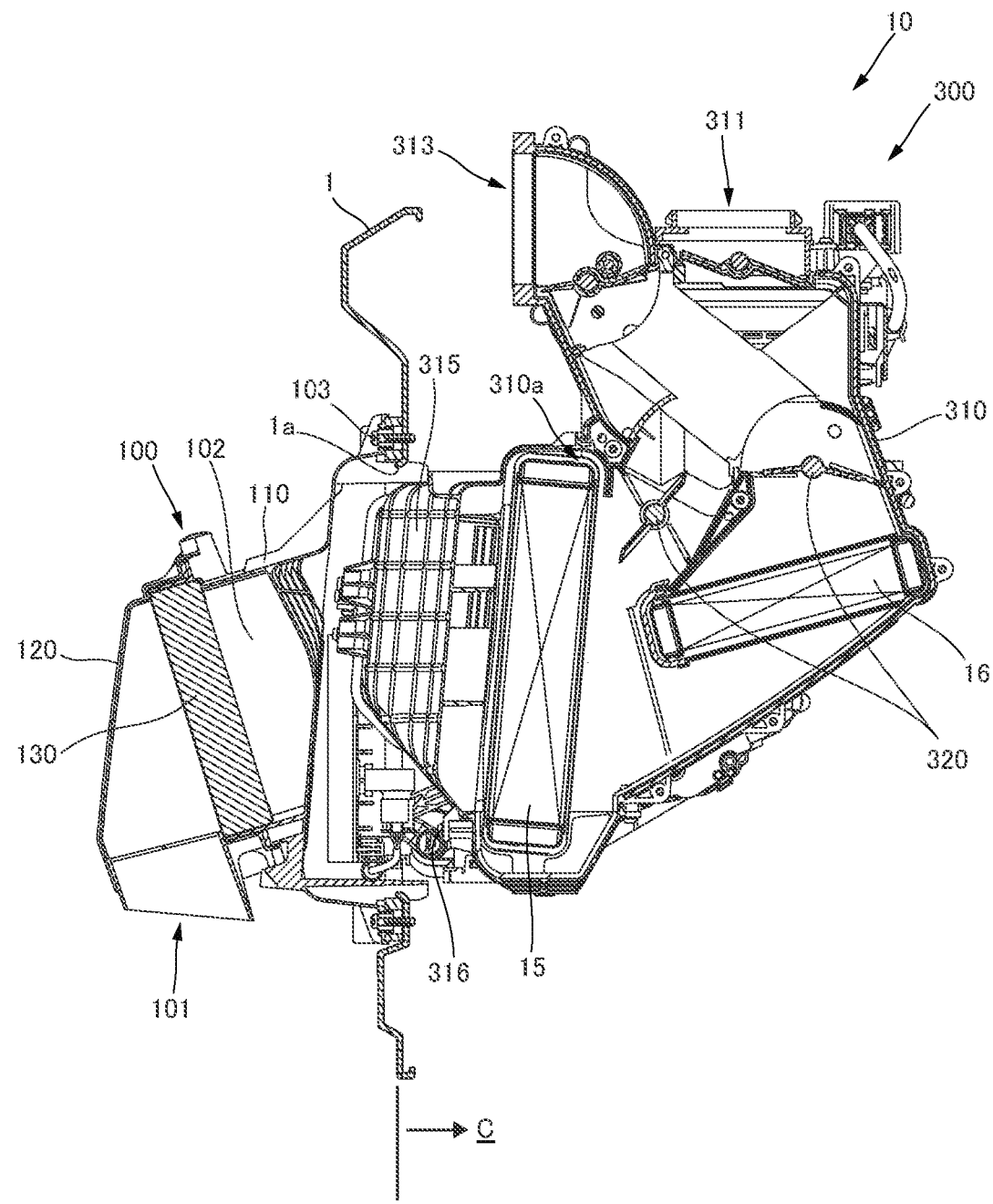
FIG. 1 is a side cross-sectional view showing primary parts of the vehicle air conditioning apparatus according to an embodiment of the present invention.

As shown in FIG. 1, this vehicle has a separating plate 1 provided on the front of the vehicle interior to separate the vehicle interior C from the outside of the vehicle interior. A rectangular air conditioning opening 1a extending in the width direction is formed in the separating plate 1.

The vehicle air conditioning apparatus 10 performs a cooling operation for decreasing the temperature in the vehicle interior C, a heating operation for increasing the temperature in the vehicle interior C, and a dehumidifying operation for decreasing the humidity in the vehicle interior C.

Figure 2:
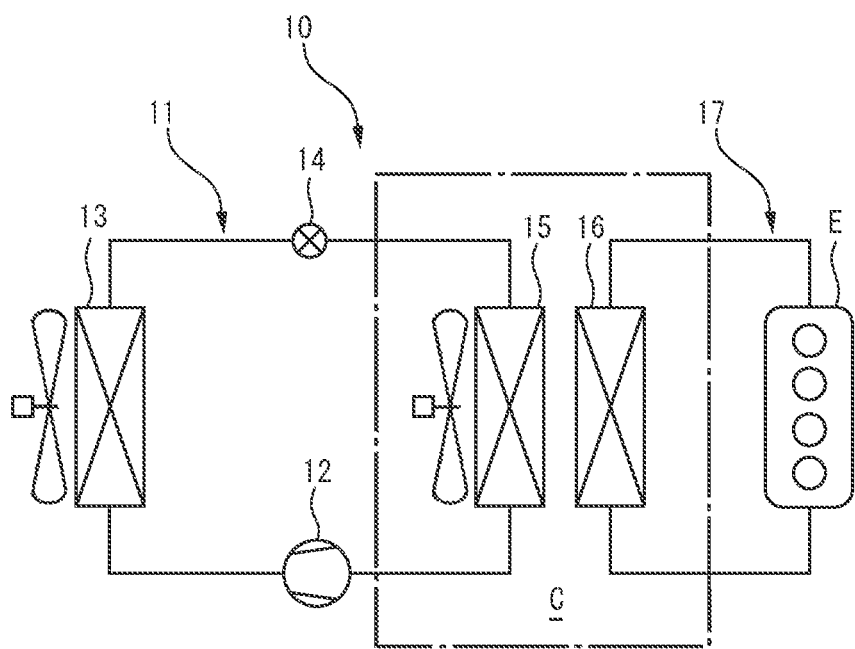
FIG. 2 is a schematic diagram showing the vehicle air conditioning apparatus.

As shown in FIG. 2, the vehicle air conditioning apparatus 10 includes a refrigerant circuit 11 for circulating a refrigerant to change the state of the refrigerant, in order to cool and dehumidify the air to be supplied into the vehicle interior C.

The refrigerant circuit 11 includes a compressor 12 configured to compress and discharge the sucked refrigerant; a condenser 13 configured to condense the refrigerant discharged from the compressor 12; an expansion valve 14 configured to decompress the refrigerant condensed in the condenser 13; and an evaporator 15 configured to evaporate the refrigerant decompressed by the expansion valve 14. These components are connected to each other by a pipe made of metal such as copper or aluminum.

In addition, as shown in FIG. 2, the vehicle air conditioning apparatus 10 includes a heater core 16 as a heater for heating the air to be supplied into the vehicle interior C. The heater core 16 is a heat exchanger constituted by fins and tubes, and is connected to an engine cooling circuit 17 for cooling the engine E. Engine cooling water having absorbed the heat discharged from the engine E flows through the tubes of the heater core 16. The heater core 16 performs a heat exchange between the engine cooling water and the air to be supplied into the vehicle interior C.

The evaporator 15 and the heater core 16 are disposed in the vehicle interior C. Meanwhile, the compressor 12, the condenser 13, and the expansion valve 14 are disposed outside of the vehicle interior C. Therefore, the refrigerant circuit 11 and the engine cooling circuit 17 are provided through the inside and outside of the vehicle interior C via the air conditioning opening 1a.

The vehicle air conditioning apparatus 10 includes: an outside air intake cover 100 provided outside of the vehicle interior C with respect to the air conditioning opening 1a and configured to take in the air from the outside of the vehicle interior C; a fan unit 200 provided inside of the vehicle interior C with respect to the air conditioning opening 1a and configured to suck any or both of the air outside of the vehicle interior C and the air inside of the vehicle interior C; and an air conditioning unit 300 provided next to the fan unit 200 in the width direction inside of the vehicle interior C with respect to the air conditioning opening 1a, for heating or cooling the air supplied from the fan unit 200 and for supplying the air into the vehicle interior C.

As shown in FIG. 1, the outside air intake cover 100 is provided to cover the air conditioning opening 1a outside of the vehicle interior C and protrude forward. An outside air inlet 101 for taking in the air outside of the vehicle interior C is provided in the lower part of the air intake cover 100. The outside air inlet 101 extends in the width direction and is open downward. A communication path 102 is provided to extend in the width direction in the outside air intake cover 100, for communicating between the outside air inlet 101 and portion that sucks the air from the fan unit 200.

The outside air intake cover 100 includes a cover body 110 detachably attached to the separating plate 1, an inlet forming member 120 detachably attached to the cover body 110, and an outside air filter 130 provided between the cover body 110 and the inlet forming member 120.

The inlet forming member 120 is detachably attached to the cover body 110 with a fastener member such as a clip or a screw.

The outside air filter 130 is configured to remove foreign objects and dust contained in the air taken from the outside of the vehicle interior C. The outside air filter 130 is disposed to extend through the communication path 102 in the width direction to separate the communication path 102 into the front side and the back side. The outside air filter 130 is attached/detached to/from the cover body 110 by removing the inlet forming member 120.

Figure 6:
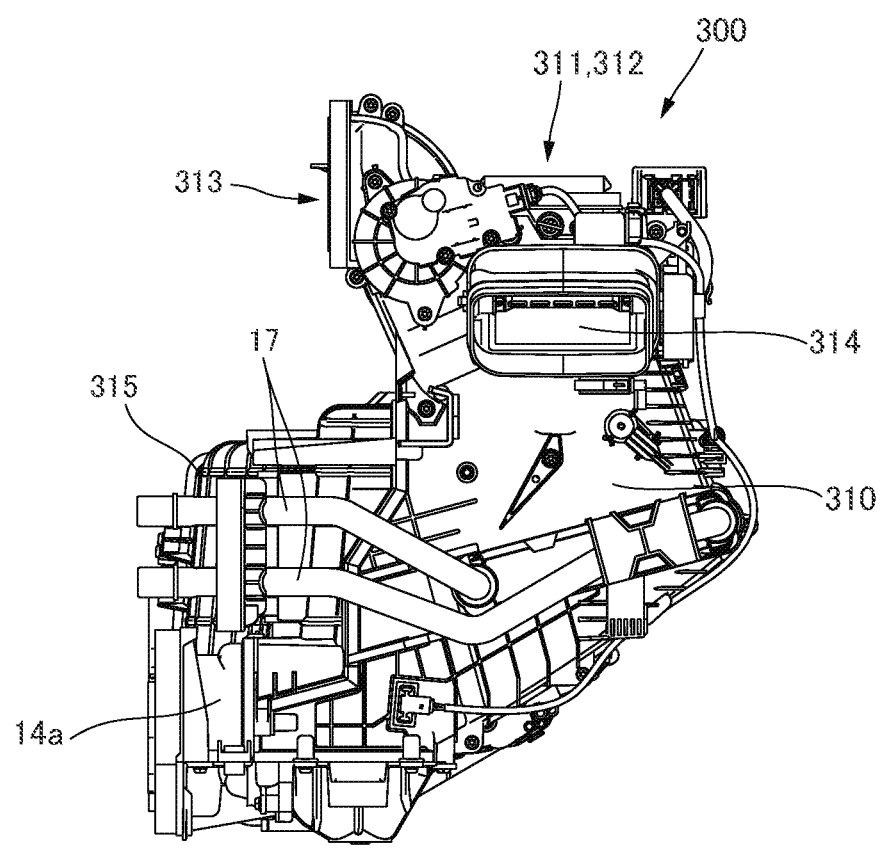
FIG. 6 is another side view showing the fan unit and the air conditioning unit.

The outside air intake cover 100 is detachably attached to the separating plate 1 by fastening the outer periphery of the cover body 110 to the rim of the air conditioning opening 1a of the separating plate 1 with a fastener member 103 such as a screw. Here, the separating plate 1 and the cover body 110 are fastened to one another by inserting the fastener member 103 backward from the front surface side of the separating plate 1. The refrigerant circuit 11 and the engine cooling circuit 17 penetrate one end of the cover body 110 in the width direction. Moreover, the expansion valve 14 connected to the refrigerant circuit 11 is disposed in front of the cover body 110. In addition, as shown in FIG. 6, the outer periphery of the expansion valve 14 is covered with a valve cover 14a detachably attached to the expansion valve 14.

The fan unit 200 includes a fan 210 and an air suction part 220. The fan 210 is provided in the upper side of the fan unit 200, and the air suction part 220 is provided in the lower side of the fan unit 200 and configured to adjust the ratio between the air inside of the vehicle interior C and the air outside of the vehicle interior C and to allow the fan 210 to suck the air.

The fan 210 includes a cylindrical impeller 211 having a plurality of blades provided on its outer periphery, a fan motor 212 as a driving part for rotating the impeller 211, and a cylindrical fan case 213 that surrounds the outer periphery of the impeller 211. The fan 210 is provided such that the rotating shaft of the impeller 211 extends in the vertical direction, and the fan motor 212 is coupled to the upper end of the rotating shaft of the impeller 211. The fan 210 sucks the air from the lower surface of the impeller 211 and discharges the air toward the air conditioning unit 300 in the width direction.

The fan case 213 includes an upper fan case 213a to which the fan motor 212 is attached, and a lower fan case 213b having an air suction port (not shown). The upper fan case 213a of the fan case 213 is fixed to a member on the air conditioning unit 300 side and a member on the vehicle side, while the lower fan case 213b is detachably attached to the upper fan case 213a.

Figure 3:
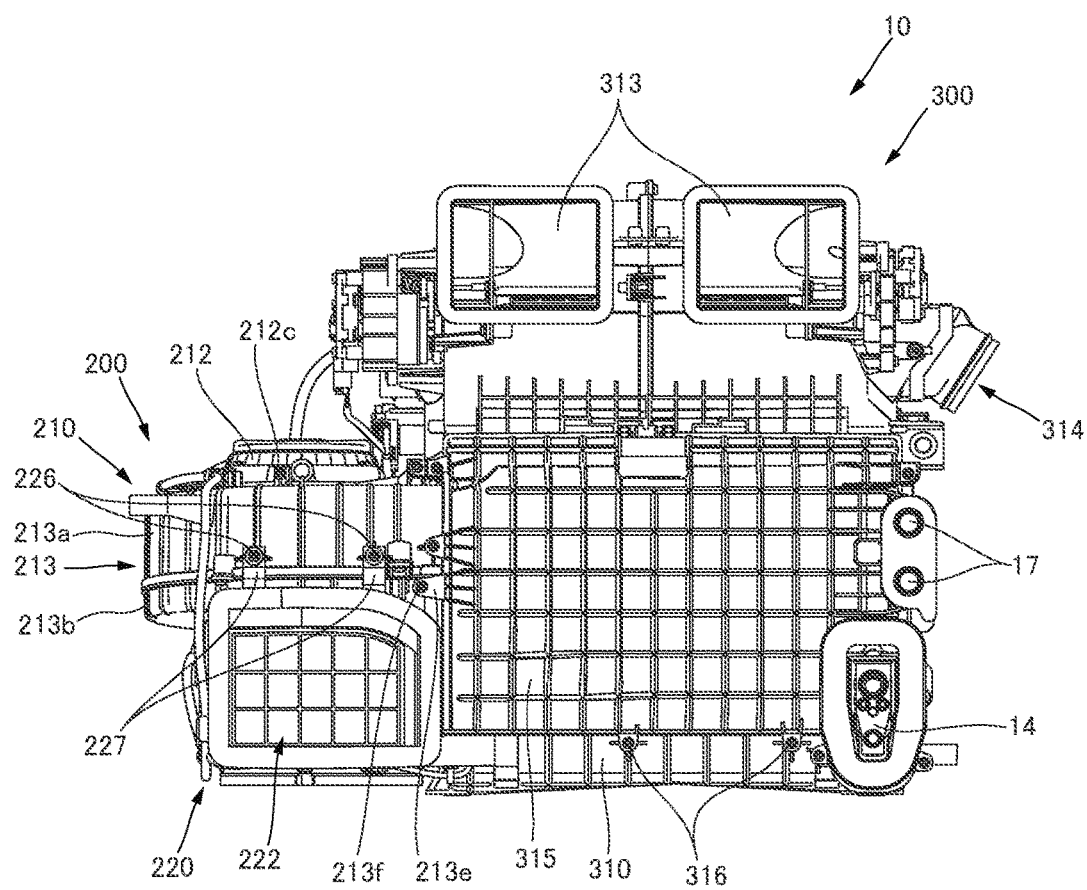
FIG. 3 is a front view showing a fan unit and an air conditioning unit.
Figure 4:
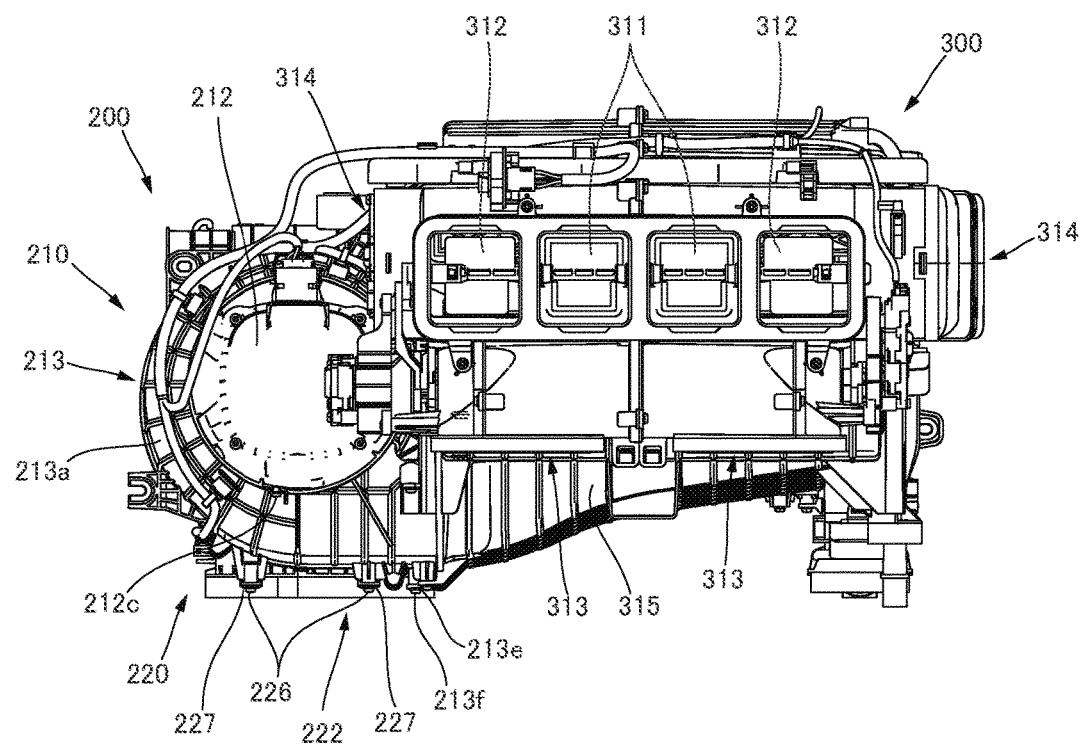
FIG. 4 is a plan view showing the fan unit and the air conditioning unit.
Figure 5:
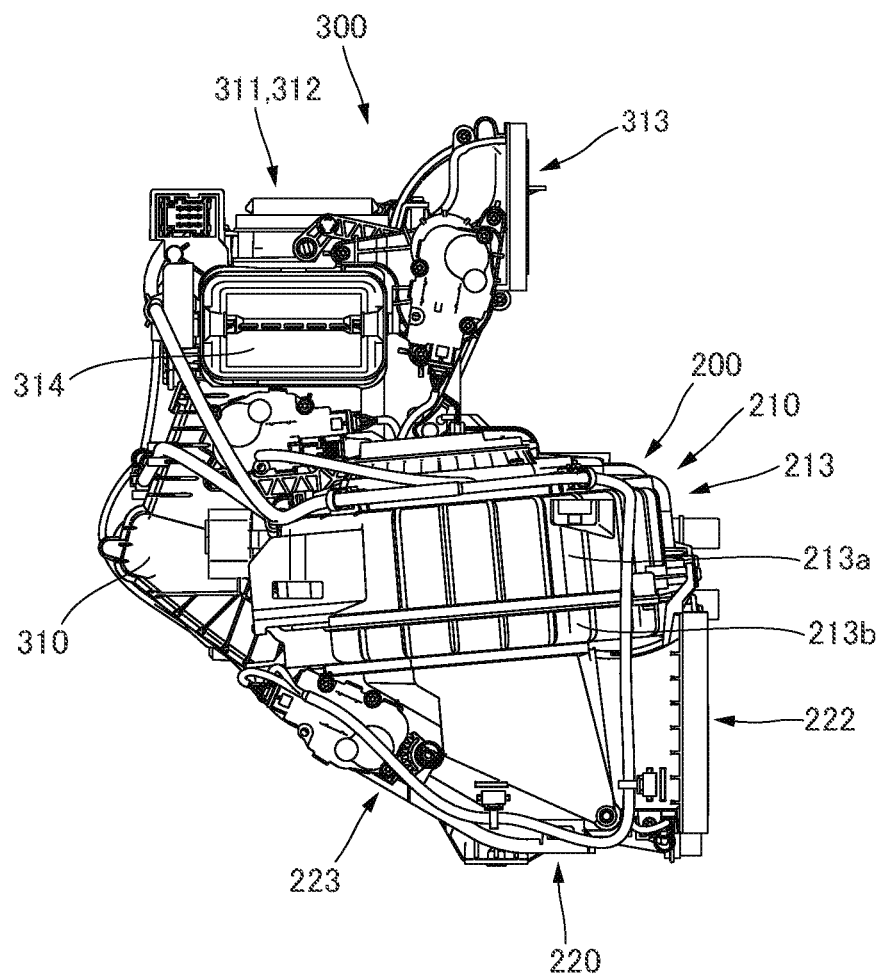
FIG. 5 is a side view showing the fan unit and the air conditioning unit.
Figure 7:
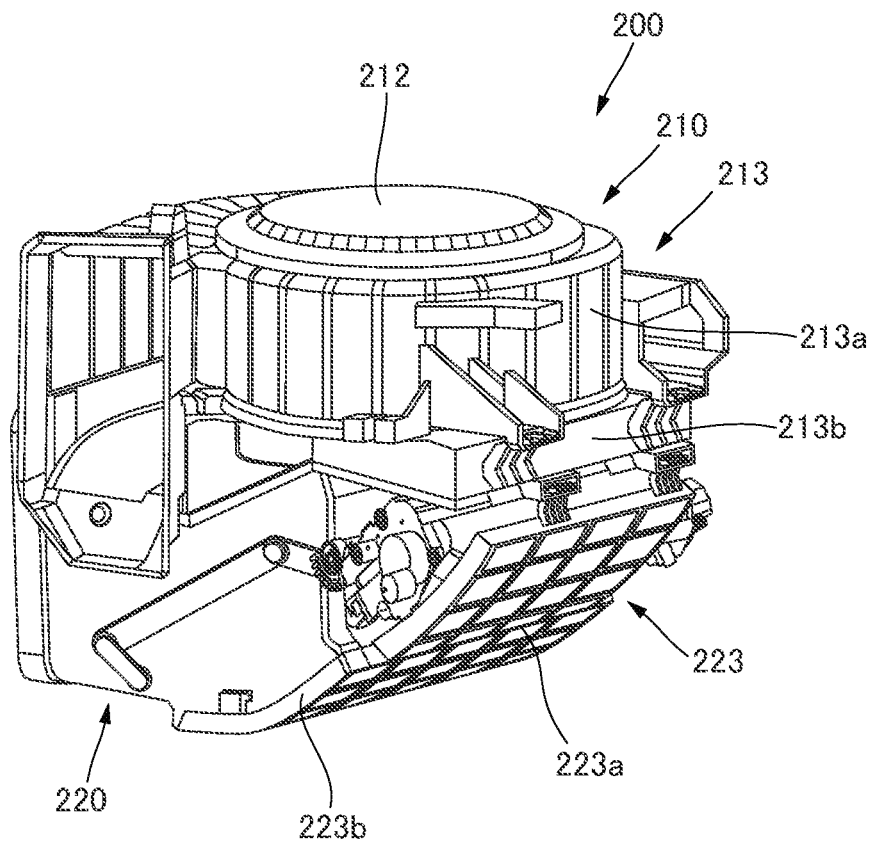
FIG. 7 is a perspective view showing the entire fan unit.
Figure 8:
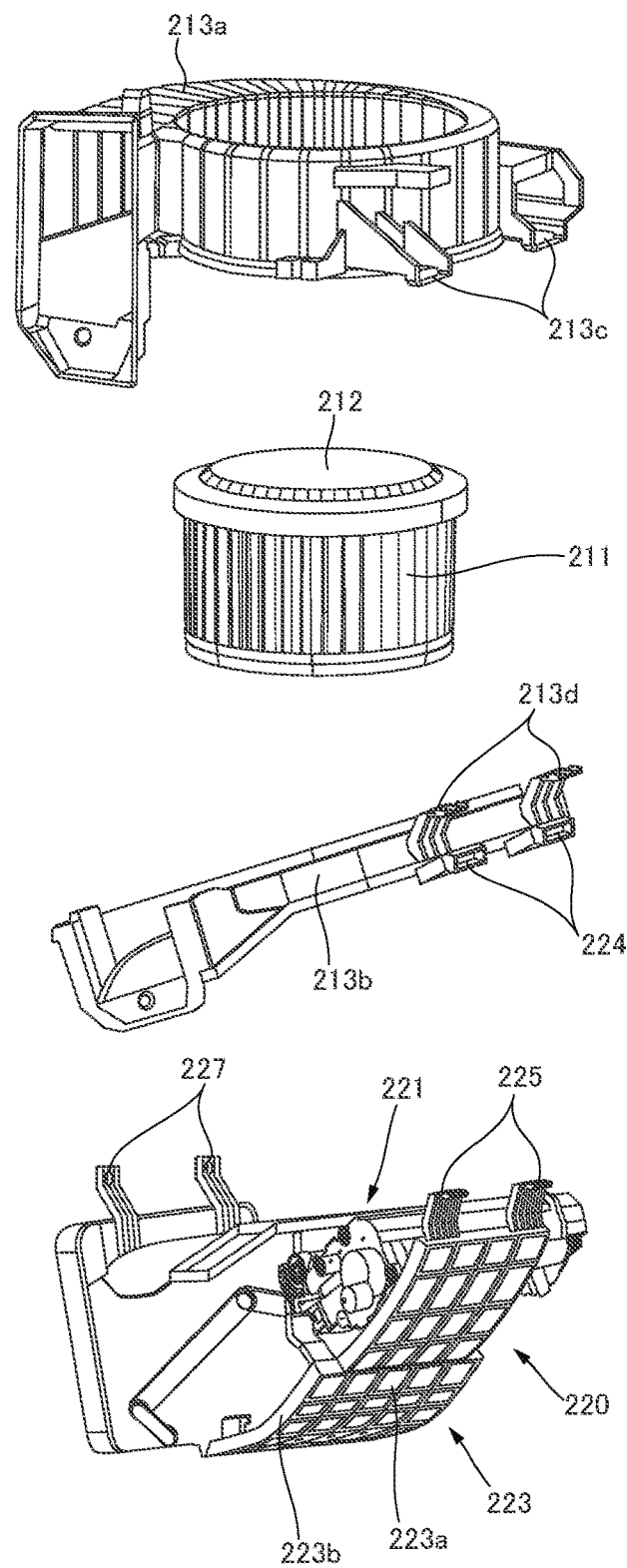
FIG. 8 is an exploded perspective view showing the fan unit.

As shown in FIGS. 7 and 8, a pair of engagement holes 213c provided in the width direction is disposed on the back of the upper fan case 213a. Meanwhile, a pair of engagement protrusions 213d which can engage with the pair of engagement holes 213c, respectively, are provided on the back of the lower fan case 213b to protrude backward. The attachment position of the lower fan case 213b is held by fastening the front side of the lower fan case 213b with attachment pieces 213e protruding from the air conditioning unit 300 side toward the fan unit 200 as shown in FIG. 3, by using fastener members 213f, while the engagement protrusions 213d are engaged with the engagement holes 213c. Here, the front side of the lower fan case 213b and the attachment pieces 213e are fastened to each another by inserting the fastener members 213f backward from the front surface side of the separating plate 1.

Figure 9:
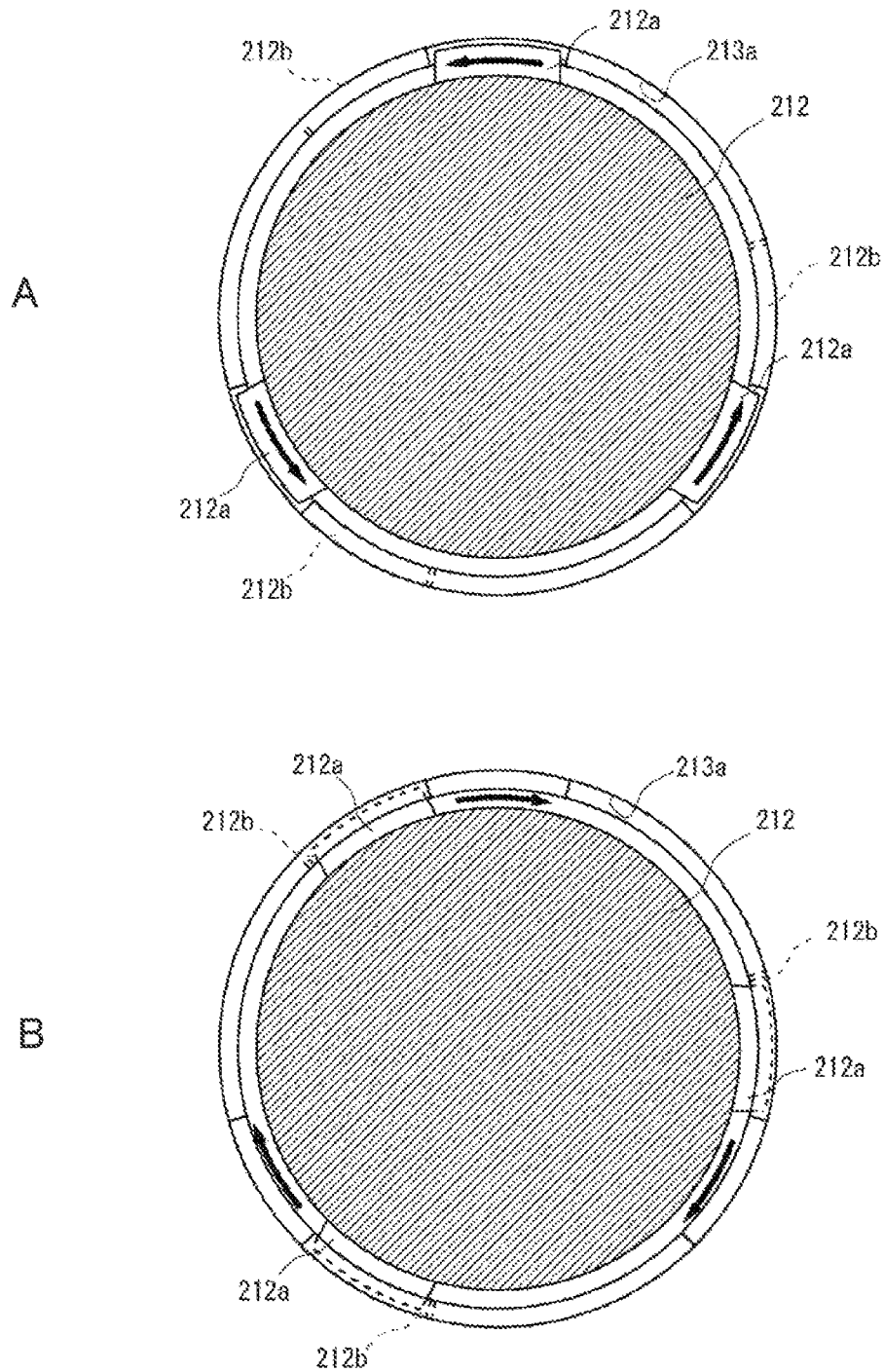
FIG. 9 is a drawing showing an upper fan case and a fan motor from below to present the relationship between extension portions and concave portions.

The fan motor 212 is detachably attached to the upper fan case 213a. As shown in FIG. 9, a plurality of extension portions 212a which are spaced from each other in the circumferential direction and extend outward in the radial direction are provided on the outer periphery of the fan motor 212. Meanwhile, as shown in FIG. 9, concave portions 212b are provided on the inner periphery of the upper fan case 213a. The concave portions 212b can engage with the extension portions 212a by rotating the fan motor 212 with respect to the upper fan case 213a in the first circumferential direction. The fan motor 212 is mounted to the upper fan case 213a by inserting the fan motor 212 into the inner periphery of the upper fan case 213a from underneath and rotating the fan motor 212 in the first circumferential direction as shown in FIG. 9 to engage the extension portions 212a with the concave portions 212b. Meanwhile, the engagement of the extension portions 212a with the concave portions 212b is released by rotating the fan motor 212 attached to the upper fan case 213a in the second circumferential direction, so that the fan motor 212 is detached from the upper fan case 213a. At this time, the impeller 211 is connected to the rotating shaft of the fan motor 212, and the fan motor 212 and the impeller 211 are attached/detached to/from the upper fan case 213a. In addition, as shown in FIG. 3, the fan motor 212 is restricted from rotating with respect to the upper fan case 213a in the circumferential direction by fastening the fan motor 212 to the upper fan case 213a by using a fastener member 212c. Here, the fan motor 212 and the upper fan case 213a are fastened to one another by inserting the fastener member 212c backward from the front surface side of the separating plate 1.

The air suction part 220 is detachably attached to the lower fan case 213b. The air suction part 220 includes: an upper surface opening 221 (shown in FIG. 8) provided in the upper surface; an outside air suction port 222 (shown in FIG. 3) provided in the front surface side and configured to suck the air flowing through the communication path 102 of the outside air intake cover 100; and an inside air suction port 223 (shown in FIGS. 7 and 8) provided in the back surface side and configured to suck the air in the vehicle interior C.

An inside air filter 223a is provided in the inside air suction port 223 of the air suction part 220 to remove foreign objects and dust contained in the air in the vehicle interior C which is sucked by the fan 210. The inside air filter 223a is provided to cover the inside air suction port 223, and detachably attached to a mesh filter cover 223b configured to allow the air to pass therethrough. The filter cover 223b is detachably attached to the inside air suction port 223.

The air suction part 220 includes a damper mechanism for adjusting the degree of the opening of each of the outside air suction port 222 and the inside air suction port 223. The damper mechanism is driven by an electric motor.

The air suction part 220 is detachably attached to the fan 210. As shown in FIGS. 7 and 8, a pair of engagement holes 224 arranged in the width direction is disposed on the back of the lower fan case 213b. Meanwhile, as shown in FIGS. 7 and 8, a pair of engagement protrusions 225 that can engage with the pair of engagement holes 224, respectively, is provided on the back of the upper portion of the air suction part 220. The attachment position of the air suction part 220 is held by fastening a pair of attachment pieces 227 extending upward from the upper portion of the front side of the air suction part 220 to the upper fan case 213a by using fastener members 226 as shown in FIG. 3, while the engagement protrusions 225 are engaged with the engagement holes 224. Here, the upper portion of the front side of the air suction part 220 and the upper fan case 213a are fastened to one another by inserting the fastener members 226 backward from the front surface side of the separating plate 1.

The air conditioning unit 300 includes: an air conditioning case 310 configured to allow the air to flow therethrough; the evaporator 15 configured to cool the air flowing through the air conditioning case 310; the heater core 16 configured to heat the air inside of the air conditioning case 310; and an air mix damper 320 configured to adjust the amount of the air heated by the heater core 16 which is part of the air flowing through the air conditioning case 310.

An inflow opening (not shown) is formed in the front portion of the surface of the air conditioning case 310 on the fan unit 200 side in the width direction. The inflow opening is configured to flow the air supplied from the fan unit 200 into the air conditioning case 310. A pair of center vent openings 311 is provided in the center of the upper surface of the air conditioning case 310 in the width direction to communicate with center vent outlets (not shown) in the vehicle interior C. A pair of side vent openings 312 is provided in the both sides of the pair of center vent openings 311 in the width direction to communicate with a side vent outlet (not shown) in the vehicle interior C. In addition, a pair of defroster openings 313 is provided to face forward in the front side of the upper portion of the air conditioning case 310 to communicate with a defroster outlet (not shown) in the vehicle interior C. Moreover, foot openings 314 are provided in both side surfaces of the upper portion of the air conditioning case 310 in the width direction to communicate with a foot outlet (not shown) in the vehicle interior C.

Figure 12:
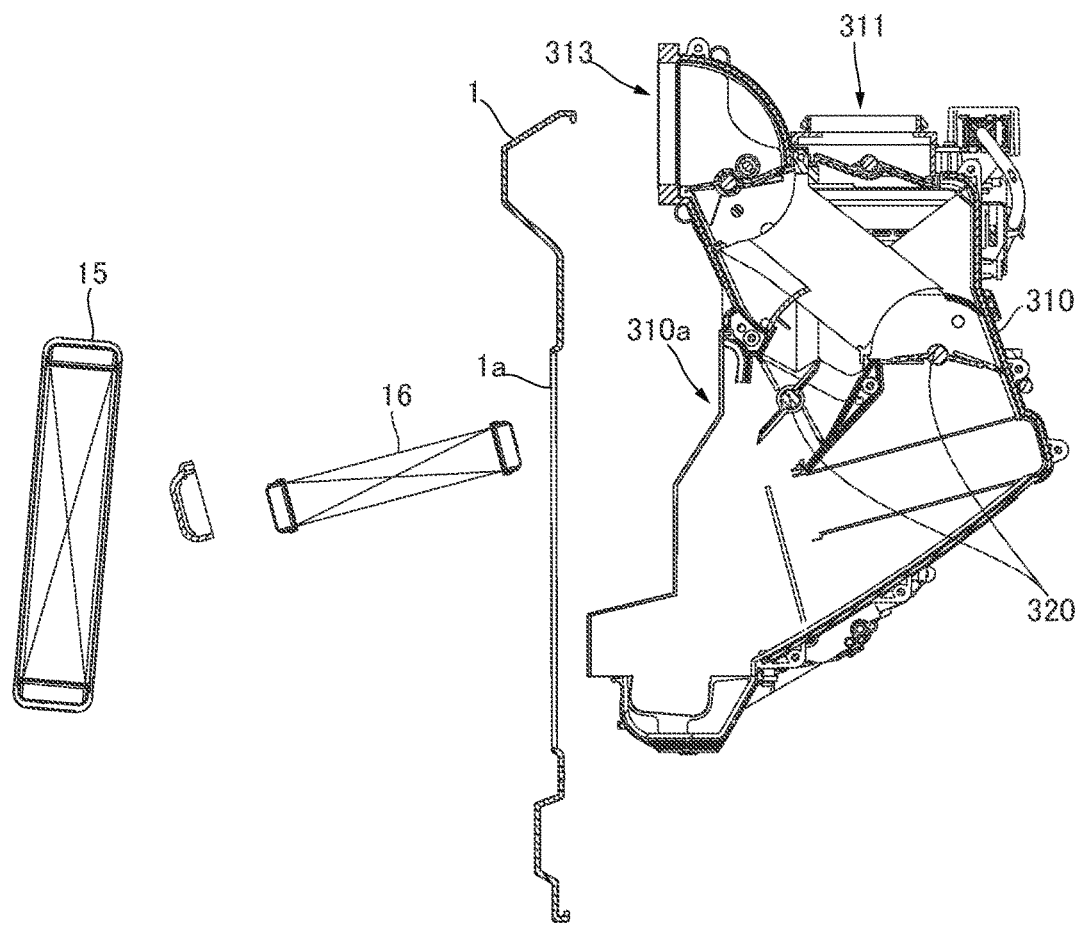
FIG. 12 is a drawing showing how to remove an evaporator and a heater core.

In addition, as shown in FIG. 12, a case opening 310a is provided in the front surface of the lower portion of the air conditioning case 310, which is open forward to expose the inside of the air conditioning case 310. The case opening 310a is closed by a case cover 315 detachably attached to the air conditioning case 310. Here, as shown in FIG. 3, the air conditioning case 310 and the case cover 315 are fastened to one another by inserting fastener members 316 backward from the front surface side of the separating plate 1.

The evaporator 15 is disposed in the front side of the air conditioning case 310, and the core heater 16 is disposed behind the evaporator 15. In this case, the evaporator 15 is disposed such that its long side direction is in the width direction and its short side direction is in the vertical direction. In addition, part of the refrigerant circuit 11 and the boxy expansion valve 14 are integrally formed with the evaporator 15. The heater core 16 is disposed such that its long side direction is in the width direction and its short side direction is approximately in the front-to-back direction. As shown in FIG. 12, the evaporator 15 and the heater core 16 can be detached from the air conditioning case 310 via the front surface of the separating plate 1 and attached to the air conditioning case 310 via the front surface of the separating plate 1 while the case cover 315 is removed from the air conditioning case 310.

In the vehicle air conditioning apparatus with the above-described configuration, the replacement and maintenance of the components of the fan unit 200 and the air conditioning unit 300 are performed as follows.

Figure 10:
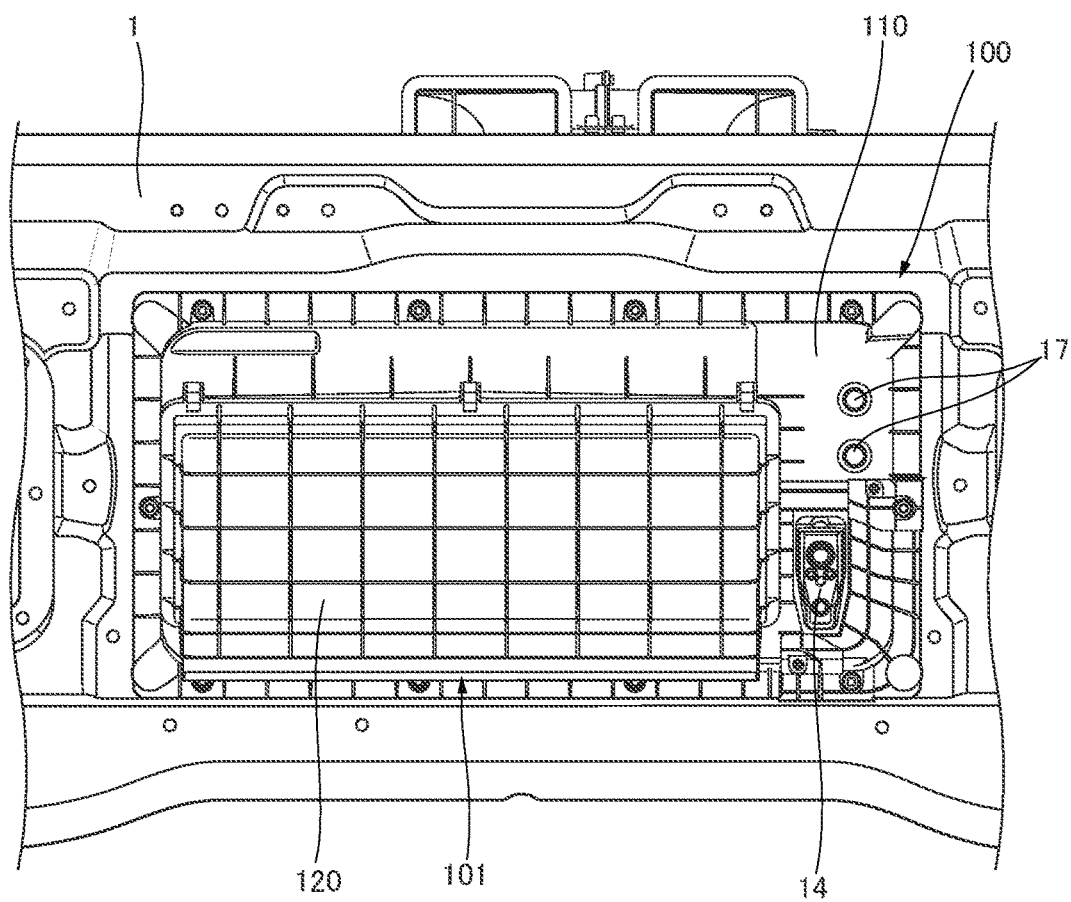
FIG. 10 is a drawing showing a state in which a front panel of the vehicle is removed.
Figure 11:
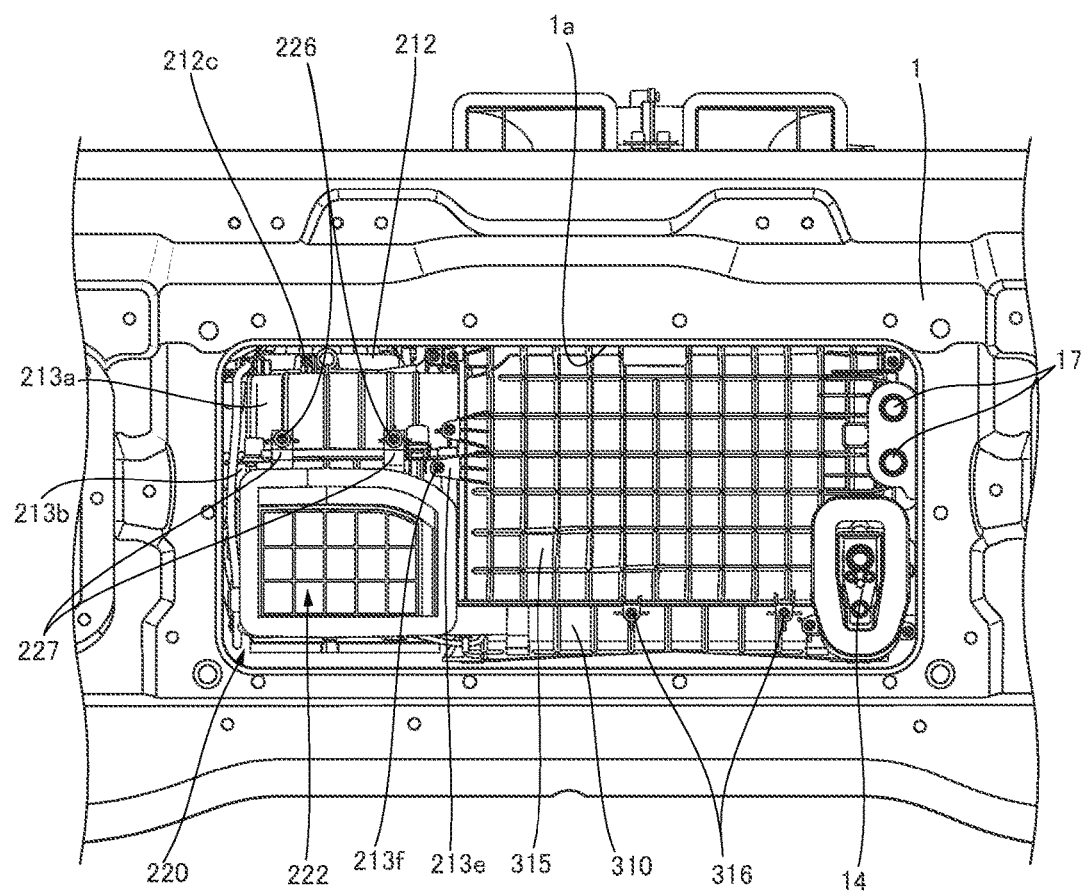
FIG. 11 is a drawing showing a state in which an outside air intake cover is removed.

First, the operator removes a front panel located in the front surface of the vehicle to expose the separating plate 1. This allows the outer air intake cover 100 covering the front surface of the air conditioning opening 1a of the separating plate 1 to be exposed as shown in FIG. 10.

Next, the operator unfastens the fastener member 103 on the front surface side of the separating plate 1 by using a tool such as a screwdriver to remove the outer air intake cover 100 from the separating plate 1. By this means, the air conditioning opening 1a is exposed to the front surface of the vehicle, and the front surfaces of the fan unit 200 and the air conditioning unit 300 are exposed via the air conditioning opening 1a.

When the inside air filter 223a of the fan unit 200 is cleaned or replaced, the operator unfastens the fastener members 226 on the front surface side of the separating plate 1 and moves the air suction part 220 forward to release the engagement of the engagement holes 224 with the engagement protrusions 225, and then removes the air suction part 220 from the lower fan case 213b. By this means, the operator can remove the filter cover 223b to clean or replace the inside air filter 223a, watching the inside air suction port 223 of the air suction part 220.

When the fan motor 212 is repaired or replaced, the operator unfastens the fastener member 103 on the front surface side of the separating plate 1 while the air suction part 220 is removed from the lower fan case 213b, and moves the lower fan case 213b forward to release the engagement of the engagement members 213c with the engagement protrusions 213d, and then removes the lower fan case 213b from the upper fan case 213a. After removing the lower fan case 213b from the upper fan case 213a, the operator unfastens the fastener member 212c and rotates the fan motor 212 in the second circumferential direction, so that it is possible to release the engagement of the expansion portions 212a with the concave portions 212b. Then, the operator moves the fan motor 212 down with respect to the upper fan case 213a, so that it is possible to remove the fan motor 212.

In contrast, the operator attaches the removed fan motor 212, lower fan case 213b and air suction part 220 to the upper fan case 213a via the front surface side of the separating plate 1 in the reverse order for which the fan motor 212, the lower fan case 213b and the air suction part 220 are removed, so that it is possible to assemble the fan unit 200.

In addition, when the evaporator 15 and the heater core 16 of the air conditioning unit 300 are repaired or replaced, the operator unfastens the fastener members 316 on the front surface side of the separating plate 1 to remove the case cover 315. By this means, the inside of the air conditioning case 310 is exposed to the front surface of the vehicle via the air conditioning opening 1a. In this state, the operator can take out the evaporator 15 and the heater core 16 in turn from the front surface side of the separating plate 1, via the air conditioning opening 1a.

In contrast, the operator attaches the removed evaporator 15 and heater 16 to the air conditioning case 310 via the front surface side of the separating plate 1 in the reverse order for which the evaporator 15 and the heater core 16 are removed, and then attaches the case cover 315 to the air conditioning case 310, so that it is possible to assemble the air conditioning unit 300.

As described above, the vehicle air conditioning apparatus according to the present embodiment includes the air conditioning case 310 which is provided inside of the vehicle interior C with respect to the air conditioning opening 1a to accommodate the evaporator 15 for cooling the air and the heater core 16 for heating the air which are arranged in the front-to-back direction. The air conditioning case 310 includes the case opening 310a which opens to the air conditioning opening 1a, and the case cover 315 which can open and close the case opening 310a.

The case cover 315 can be attached/detached to/from the air conditioning case 310 via the air conditioning opening outside of the vehicle interior C. The evaporator 15 and the heater core 16 can be attached/detached to/from the air conditioning case 310 via the air conditioning opening 1a outside of the vehicle interior C while the case cover 315 is removed to open the case opening 310a.

By this means, the evaporator 15 and the heater core 16 can be attached/detached to/from the air conditioning case 310 via the air conditioning opening 1a. Therefore, it is possible to facilitate the work for replacement of the evaporator 15 and the heater core 16, and consequently to improve the working efficiency of the maintenance or repair.

In addition, the case cover 315 is fastened to the air conditioning case 310 with the fastener members 316 such as screws by inserting the fastener members 316 backward from the front surface of the vehicle.

By this means, it is possible to facilitate the work for fastening the case cover 315 to the air conditioning case 310, and therefore it is possible to further improve the work efficiency of the maintenance or repair.

In addition, the vehicle air conditioning apparatus according to the present embodiment includes the fan unit 200 provided inside of the vehicle interior C with respect to the air conditioning opening 1a to supply the air into the air conditioning case 310. The fan unit 200 includes the fan motor 212 for rotating the impeller 211, and the air suction part 220 for sucking the air to be supplied into the air conditioning case 310. The air suction part 220 can be attached/detached to/from the fan unit 200 via the air conditioning opening 1a outside of the vehicle interior C. The fan motor 212 can be attached/detached to/from the fan unit 200 via the air conditioning opening 1a outside of the vehicle interior C while the air suction part 220 is removed from the fan unit 200.

By this means, the inside air filter 223a and the fan motor 212 can be attached/detached to/from the fan unit 200 via the air conditioning opening 1a, and therefore it is possible to facilitate the work for replacing the inside air filter 223a and the fan motor 212. As a result, it is possible to improve the working efficiency of the maintenance or repair.

Moreover, the air suction part 220 is fastened to the fan unit 200 with the fastener members 226 such as screws by inserting the fastener members 226 backward from the front surface of the vehicle.

By this means, it is possible to facilitate the work for fastening the air suction part 220 to the fan 210. Consequently, it is possible to further improve the working efficiency of the maintenance or repair.

In addition, the fan motor 212 is attached/detached to/from the upper fan case 213a by rotating the fan motor 212 about the rotating shaft of the impeller 211.

By this means, it is possible to facilitate the work for attaching/detaching the fan motor 212 to/from the upper fan case 213a, and therefore to further improve the working efficiency of the maintenance or repair.

Moreover, the outside air intake cover 100 is provided outside of the vehicle interior C with respect to the air conditioning opening 1a. The outside air intake cover 100 can be attached/detached to/from the front surface of the vehicle to guide the air taken from the outside air inlet 101 to the air suction part 220 of the fan unit 200.

By removing the outside air intake cover 100 from the front surface side of the vehicle, it is possible to expose the fan unit 200 and the air conditioning unit 300 from the front surface of the vehicle via the air conditioning opening 1a. Therefore, it is possible to further improve the working efficiency of the maintenance or repair.

Figure 13:
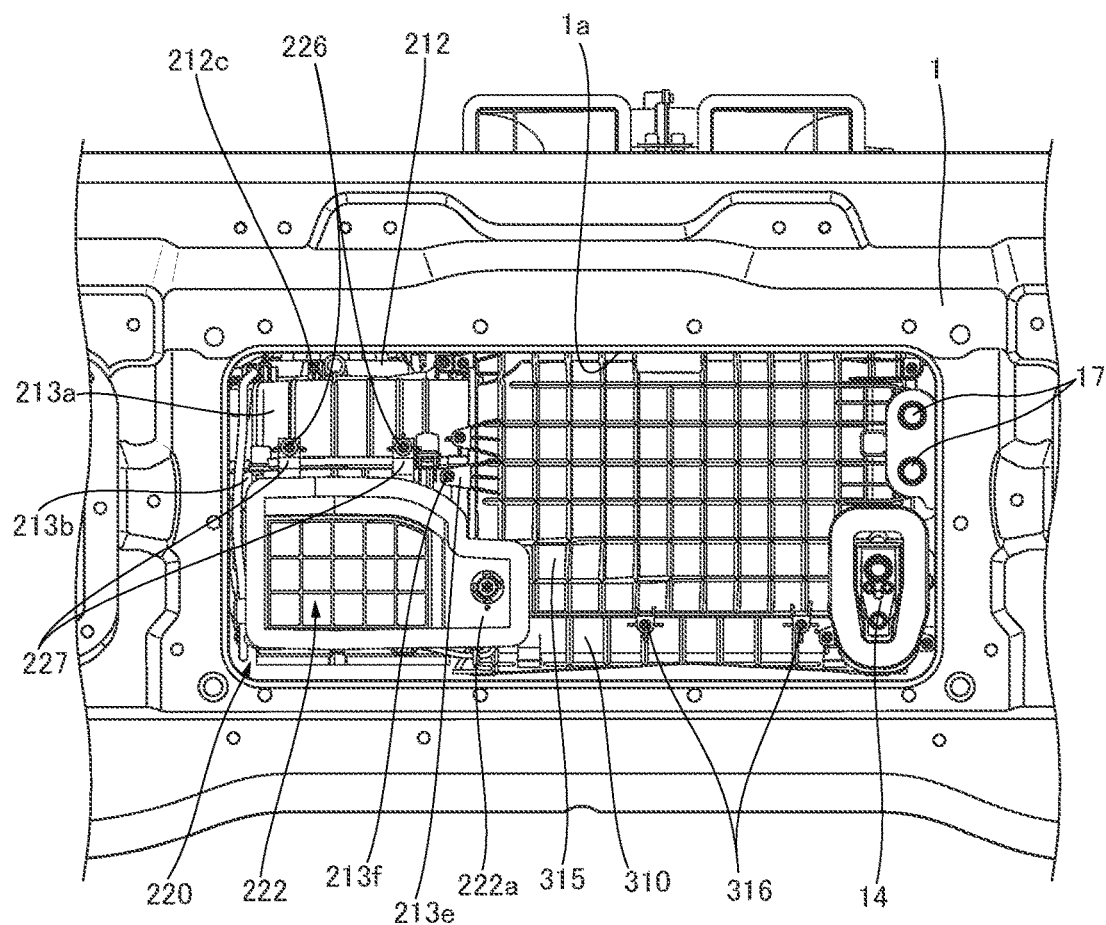
FIG. 13 is a drawing showing the vehicle air conditioning apparatus according to another embodiment of the present invention.

FIG. 13 shows another embodiment of the present invention. Here, the components which are the same as those in the above-described embodiment are assigned the same reference numerals.

The outside air suction port 222 of the air suction part 220 of the fan unit 200 according to the present embodiment is provided with an odor detection part 222a for detecting the odor concentration of the outside air. The odor detection part 222a is used to stop sucking the air from the outside air suction port 222 when the odor concentration is equal to or higher than a predetermined level. The odor detection part 222a is provided to protrude toward the air conditioning unit 300 in the width direction, and a well-known odor sensor is mounted in the odor detection part 222a.

In addition, with the present embodiment, the dimension for which the expansion valve 14 protrudes beyond the cover body 110 is smaller than the previous embodiment, and the dimension of the air conditioning opening 1a in the vertical direction is smaller than the previous embodiment.

With the vehicle air conditioning apparatus with the above-described configuration, in order to remove the case cover 315 from the air conditioning unit 300, the operator removes the air suction part 220 from the fan unit 200, and also removes the valve cover 14a covering the outer periphery of the expansion valve 14, and then removes the fastener members 316 from the front surface side of the separating plate 1. By this means, the inside of the air conditioning case 310 is exposed to the front surface of the vehicle via the air conditioning opening 1a. In this state, the operator can take out the evaporator 15 and the heater core 16 in turn from the front surface side of the separating plate 1, via the air conditioning opening 1a.

As described above, the vehicle air conditioning apparatus according to the present embodiment includes the air conditioning case 310 provided inside of the vehicle interior C with respect to the air conditioning opening 1a to accommodate the evaporator 15 for cooling the air and the heater core 16 for heating the air which are arranged in the front-to-back direction. The air conditioning case 310 includes the case opening 310a which opens to the air conditioning opening 1a, and the case cover 315 which can open and close the case opening 310a. The case cover 315 can be attached/detached to/from the air conditioning case 310 via the air conditioning opening 1a outside of vehicle interior C.

The evaporator 15 and the heater core 16 can be attached/detached to/from the air conditioning case 310 via the air conditioning opening 1a outside of the vehicle interior C while the case opening 310a is open after removing the air suction part 220 and the valve cover 14a and then removing the case cover 315.

By this means, it is possible to attach/detach the evaporator 15 and the heater core 16 to/from the air conditioning case 310 via the air conditioning opening 1a, and therefore to facilitate the working for replacing the evaporator 15 and the heater core 16. As a result, it is possible to improve the working efficiency of the maintenance or repair.

Here, with the present embodiment, it is advantageous that the dimension of the air conditioning opening 1a in each of the vertical direction and the width direction is greater to improve the working efficiency. However, the dimension of the air conditioning opening 1a in each of the vertical direction and the width direction is not limited as long as it at least allows the fan motor 212 and the air suction part 220 of the fan unit 200, the case cover 315, the evaporator 15, and the heater core 16 to be removed therethrough.

In addition, although a configuration where the expansion valve 14 is disposed in front of the air conditioning opening 1a has been described, it is by no means limiting. Another configuration is possible where the expansion valve 14 is disposed in front of the separating plate 1 out of the range of the air conditioning opening 1a. This further facilitates the work for attaching/detaching the case cover 315, and therefore it is possible to further reduce the dimension of the air conditioning opening 1a in each of the vertical direction and the width direction.

REFERENCE SIGNS LIST 1 separating plate, 1a air conditioning opening, 10 vehicle air conditioning apparatus, 15 evaporator, 16 heater core, 100 outside air intake cover, 200 fan unit, 210 fan, 211 impeller, 212 fan motor, 213 fan case, 220 air suction part, 300 air conditioning unit, 310 air conditioning case, 310a case opening, 315 case cover.

The invention claimed is:

1. A vehicle air conditioning apparatus used in a vehicle, the vehicle having a front and a back, and a right and a left extending in a width direction perpendicular to a front-to-back direction the vehicle including a separating plate provided on a front of a vehicle interior provided above an engine as a power source for driving the vehicle, the separating plate separating the vehicle interior from an outside of the vehicle interior and having an air conditioning opening, the vehicle air conditioning apparatus comprising:
   an air conditioning case provided inside of the vehicle interior with respect to the air conditioning opening and configured to accommodate an evaporator for cooling air and a heater for heating the air, the evaporator and the heater being arranged in the air conditioning case in the front-to-back direction; and
   a fan unit provided inside of the vehicle interior with respect to the air conditioning opening and configured to supply the air into the air conditioning case, wherein:
   the air conditioning case includes a case body having a case opening that is open to the air conditioning opening, and a case cover that can open and close the case opening;
   the case cover can be attached to and detached from the case body via the air conditioning opening outside of the vehicle interior;
   the evaporator is disposed in the case body such that its long side direction is in the width direction of the vehicle and its short side direction is in a vertical direction, and a front surface of the evaporator is exposed to the outside of the vehicle interior via the air conditioning opening and the case opening while the case cover is removed;
   the heater is disposed in the case body behind the evaporator such that its long side direction is in the width direction of the vehicle and its short side direction is in the front-to-back direction; and
   the evaporator and the heater can be attached to and detached from the case body via the air conditioning opening outside of the vehicle interior, while the case cover is removed from the case body to open the case opening.

2. The vehicle air conditioning apparatus according to claim 1, wherein:
   an outside air inlet configured to take in the air from the outside of the vehicle interior is provided outside of the vehicle interior with respect to the air conditioning opening; and
   an outside air intake cover configured to guide the air taken from the outside air inlet to an air suction part is provided to be able to be attached to and detached from a front surface of the vehicle.

3. The vehicle air conditioning apparatus according to claim 1, wherein:
   the case cover is fastened to the case body with a screw fastener member; and
   the screw fastener member is inserted from a front surface of the vehicle to fasten the case cover to the case body.

4. The vehicle air conditioning apparatus according to claim 3, wherein:
   an outside air inlet configured to take in the air from the outside of the vehicle interior is provided outside of the vehicle interior with respect to the air conditioning opening; and
   an outside air intake cover configured to guide the air taken from the outside air inlet to an air suction part is provided to be able to be attached to and detached from a front surface of the vehicle.

* * * * *